N. H. SOOY.
MOTOR PROPELLED AND OTHER VEHICLE.
APPLICATION FILED FEB. 8, 1911.

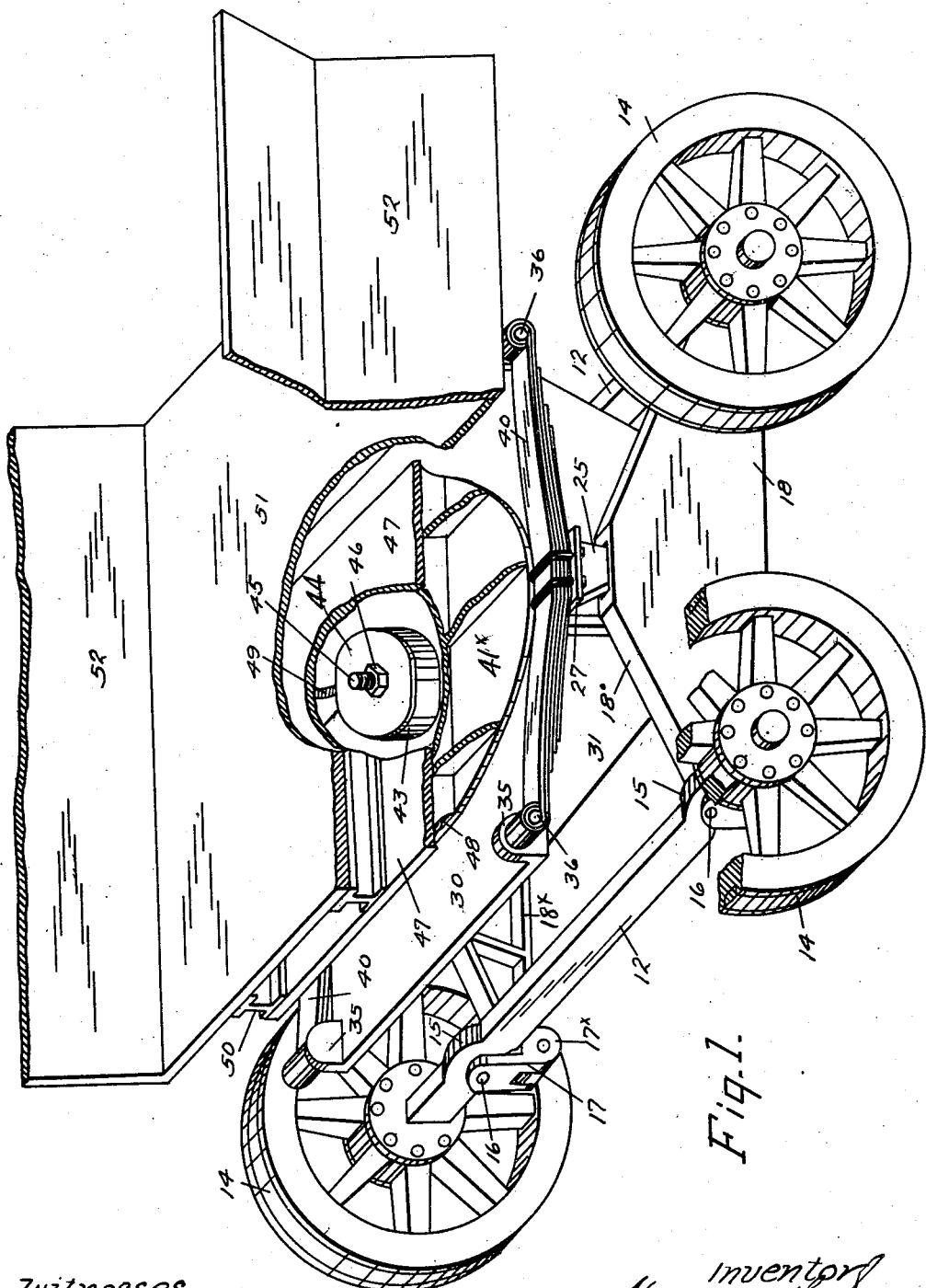

1,008,212.

Patented Nov. 7, 1911.
3 SHEETS—SHEET 2.

Witnesses
C. L. Brown
Francis A. Leach

Inventor
Norman H. Sooy
By Rich & Manning
Attorney

N. H. SOOY.
MOTOR PROPELLED AND OTHER VEHICLE.
APPLICATION FILED FEB. 8, 1911.
1,008,212.
Patented Nov. 7, 1911.
3 SHEETS—SHEET 3.
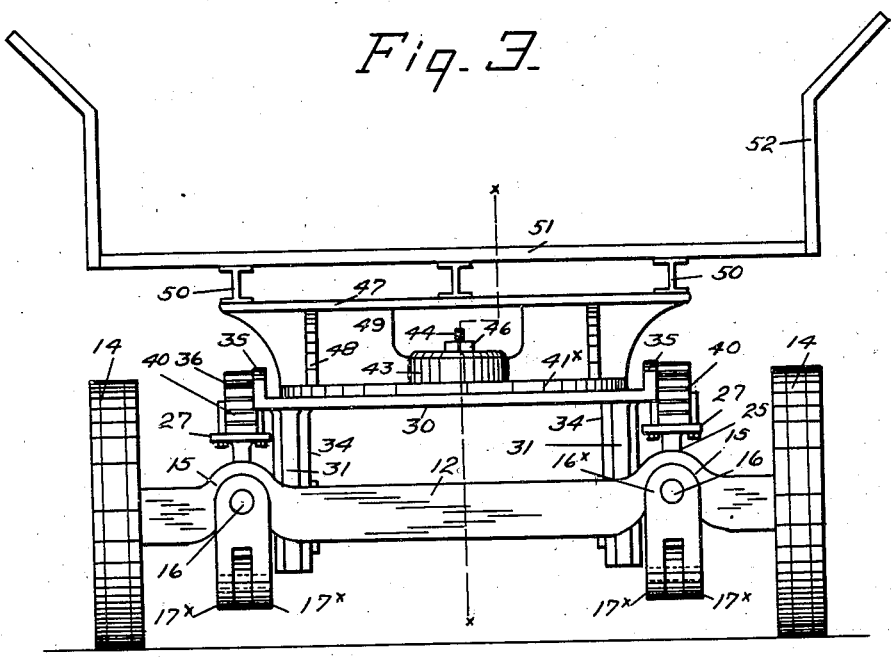
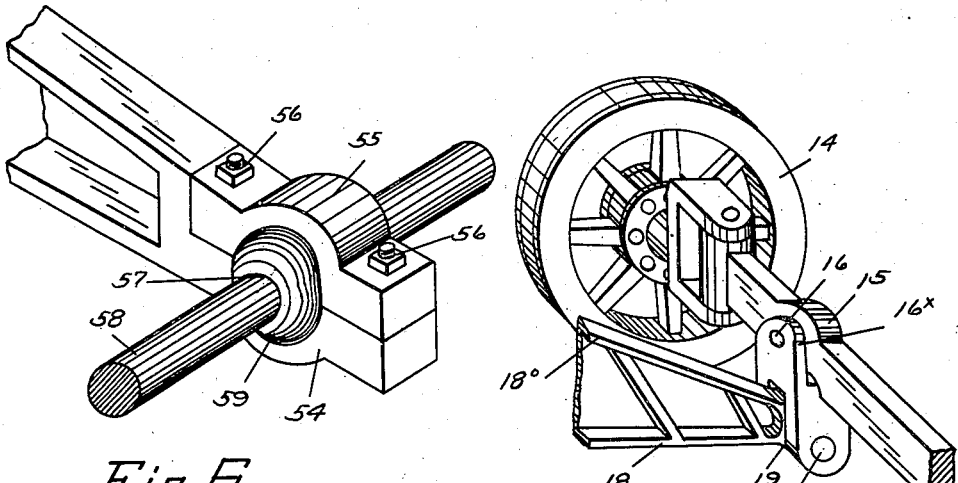
Witnesses.
C. L. Brown
Francis A. Lesek
Inventor
Norman H. Sooy
By Rich & Manning
Attorney

UNITED STATES PATENT OFFICE.

NORMAN H. SOOY, OF KANSAS CITY, MISSOURI.

MOTOR-PROPELLED AND OTHER VEHICLE.

1,008,212.  Specification of Letters Patent.  Patented Nov. 7, 1911.

Application filed February 8, 1911. Serial No. 607,333.

*To all whom it may concern:*

Be it known that I, NORMAN H. SOOY, a citizen of the United States of America, residing at Kansas City, in the county of Jackson and State of Missouri, have invented certain new and useful Improvements in Motor-Propelled and other Vehicles; and I do hereby declare that the following is a full, clear, and exact description of the invention, such as will enable others to make and use the same, reference being had to the accompanying drawings, forming a part of this specification.

In the ordinary axle supported side beams to motor and other vehicles, and especially to wagon and car trucks, these frames or beams are either rigidly connected with the axle or by means of springs, affording the necessary relief from shock or jar in passing over rough or uneven roads. The most frequent and at the same time destructive wear upon the trucks is occasioned by the contact of one of the wheels on one side of the truck with an obstacle in its path, over which it is forcibly drawn, causing thereby violent shocks to be transmitted to the body of the wagon.

The objects of my invention are: first, to reduce the shock to the body of the wagon or vehicle, resulting from the passage of the wheels over obstacles in their path, approximately one-half; and secondly, to divide the strain of the load equally between the axles upon all conditions, and reduce the wear and tear formerly sustained by a single axle.

The invention consists in the novel construction and combination of parts, such as will be fully described and then specifically pointed out in the claims.

Figure 5:
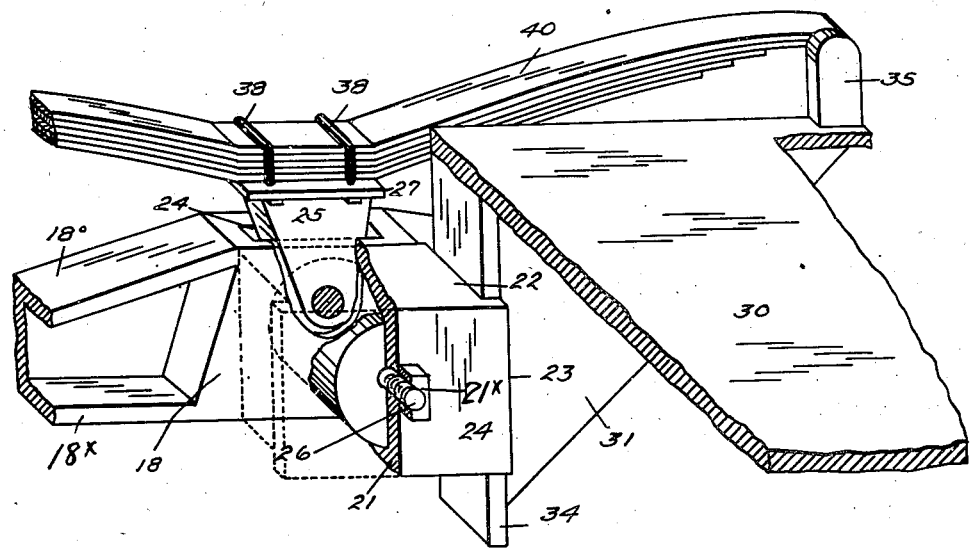
Figure 2:
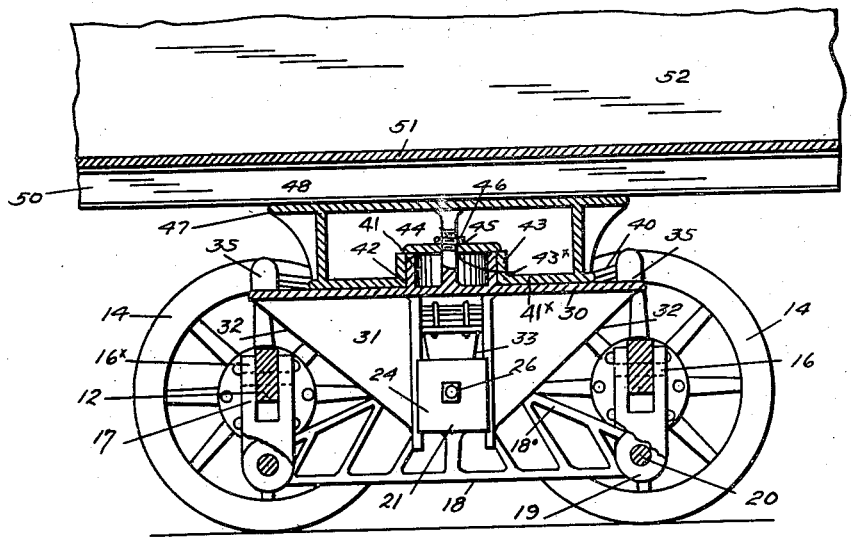

In the drawings: Figure 1. is an isometric view of the truck, and the end portion of the body of a wagon, supported by the truck, embodying the invention. Fig. 2. is a longitudinal, vertical, sectional view of the body of the wagon, taken intermediate its sides, as seen in Fig. 1, showing the axles of the truck in section. Fig. 3. is an end view of the wagon, as seen in Fig. 1. Fig. 4. is a detail, isometric view of a portion of the axle and of the yoke beam connection, as in Fig. 1, showing its application to steering wheels for motor vehicles. Fig. 5. is a detail, isometric view of a portion of the slotted side bearing and yoke beam, separating the body of the wagon, showing the sliding cross head, or block, and pivoted spring bearing. Fig. 6. is a detail, isometric view of a modification of the yoke and axle bearing.

Similar numerals of reference indicate corresponding parts in all the figures of the drawings.

Referring to the drawings, 10 indicates a four-wheel truck, which consists of the parallel axles 12, of uniform length, upon the ends of which axles are mounted, in the ordinary manner, the wheels 14, which wheels are of the same circumference. As shown, the axles 12 are made of metal bars, rectangular in cross section, these bars being spaced apart the requisite distance. At points short distances inwardly from the wheels 14, portions 15, of the ends of the respective axles, are bent upwardly a short distance above the plane of the axles, in an upwardly curved line, for the purpose further explained. With the said upwardly-bent portions 15, of the axles 12, are pivotally connected at 16, the upper forked ends $16^x$, of depending links 17, these forked portions $16^x$, of the links being contiguous with the forward and rear surfaces of the said bent portions 15, of the axles. The lower portions of the depending links, which extend downwardly to within a short distance from the ground, are also forked as at $17^x$, these forked portions being at right angles to the upper, forked portions $16^x$. These suspended links 17 oscillate as far as required to maintain a perpendicular position, in the event of the elevation of the wheels 14, of the truck, upon one side of the vehicle, above the ordinary level of the other wheels.

The parallel axles 12 are maintained at equal distances from each other, by means of the yoke or side beams 18. These beams as shown consist of trussed frames, the lower, horizontal chord $18^x$ of each frame, and the downwardly-bent portions 18°, of the upper chord of the trussed frames having integrally-formed terminal bosses 19, which extend within the forked lower portions $17^x$, of the links 17, and through which portions of the links and bosses extend the pivots 20.

Adjacent to the inner portions of the yoke beam 18, intermediate the ends of each beam, is a rectangular shaped block or cross-head The grooved sides 22, of the cross-head extend inwardly a short distance, and from the line of the upper chord 18°, of the yoke beam downwardly about one-half the distance toward the lower chord $18^x$. The ends of face plate 23 of the cross head form guide flanges as further described. This crosshead is loosely mounted on a stud 21ˣ, fixedly connected with the yoke beam. In the portion 18°, of the yoke frame, is a vertical slot 24, in which slot or opening is extended the lower end of a downwardly-tapering plate 25, which lower end of said plate 25 is pivotally connected with a pivot bolt 26, also rigidly connected with the yoke beam slightly above a line passing axially through the stud 21ˣ. The upper end of plate 25 extends a stort distance above the plane of the upper surface of the chord 18°, of the yoke beam 18, and upon the upper end of said plate is a horizontal flat plate 27, of considerable width.

The truck body consists of a rectangular plate 30, extended transversely to the truck yoke 18, and located in position a suitable height above the plane of the upper surfaces of the plates 27, on the pivoted plate 25, in the boxing 21, one portion of said plate extending from a position slightly within a vertical line of the inner surface of the plates 25, on one side of the truck and to a position in a vertical line with the inner surface of the plate 25, on the opposite side of the truck. With the lower surfaces and outer longitudinal portions of plate 30, are rigidly connected the brace webs 31. These webs as seen are cast preferably solid, and extend downwardly adjacent to the inner surfaces of the yoke beams 18, a considerable distance. The end portions of the webs incline inwardly and downwardly, as at 32. In the portion of each web 31 between its inclined end portions, is a wide, vertical guide opening 33, the sides of which opening are extended past the lines of the inner and outer surfaces of the webs, to form flanges 34. These flanged portions 34, of the webs, extend downwardly in sliding contact with the inner surfaces of the face plate 23 of boxing 21, on the trussed yoke-frame 18. Upon the upper surfaces and at the respective ends of the plate 30, are cast the upright lugs 35, with the upper ends of which lugs are connected rigidly the outwardly-extended wrist-pins 36.

To the upper surfaces of the plates 27, on the pivoted bearing plate 25 are secured by the straps 38, the leaf springs 40, the ends of the upper leaves of which springs on each side of plate 30 are secured to the wrist pins 36.

Upon the upper surface of the plate 30, I have shown at a point equi-distant from the lines of the outer, longitudinal surfaces of the plate, and also intermediate the ends of said plate a circular upwardly-extended hollow stem 41. (See Fig. 2.) Upon the upper surface of the plate 30 is mounted a flat plate 41ˣ, the base of which is circular and slightly smaller in size than plate 30. In the central portion of plate 41ˣ is a circular opening 42, from the sides of which opening extend upwardly a circular flange 43 which is of sufficient dimensions to receive the stem 41ˣ, thus permitting the plate 41 to have a turning movement with plate 30. On the plate 30, within the hollow stem 41 is a rigidly connected centrally-located fixed bolt 44, which is screw-threaded at 45 at its upper end. A cap plate 44, of circular formation and of the same circumference as the flange 43, bars on said flange 43. In the cap plate 44 is an opening 43ˣ through which the upper screw-threaded end of the bolt 45 extends. Upon said end of the bolt is a nut 46 securing the cap 44 in position on the upper surface of flange 43.

Above the upper surface of the plate 41ˣ is a web-supported plate 47, clearly shown in Fig. 1, and which is supported a short distance above said plate 41, by longitudinally extended outer webs 48, and transverse webs 49, these webs being cast integral with the said plates 41, and 47. Upon the upper surface of the plate 47, and in vertical lines with the outer webs 48 are secured the longitudinally-extended I beam 50, upon which the bed or platform 51, of the wagon body is laid and rigidly secured.

In the employment of my invention, which is adaptable to all kinds of vehicles for transporting loads of various kinds over rough and uneven roads, the weight of the load formerly thrown upon a single axle is now divided equally between the axles of the truck, enabling loads to be transported with greater facility and speed than hitherto over rough roads. The shock arising from obstacles in the path of the wheels is mainly absorbed between the body of the truck and wheels, thus lessening the wear on the wagon body and strain thereto. Whenever the wheels upon one side of the truck are subjected to higher elevation than the wheels upon the other side, an equalizing movement is afforded the truck frame by the link connections of the yoke beams and axles, thus providing a universal joint connection. The shock in passing over an obstacle is also absorbed by the yoke beams in the following manner. When the forward wheel rises upon an elevated plane above its previous position, the central portion of the yoke beam carrying the pivoted plate 25 rises three or more inches, thus reducing the shock one-half. The truck as shown may be employed to turn with the body of the wagon, or with an independent movement, this being immaterial, such applications of the movement being made to motor vehicles with the same advantages as to ordinary vehicles, as illustrated in Fig. 4.

The advantages of the upwardly-extended portions of the axles affords a higher elevation of the yoke beams, and positions the pivot of the links above the horizontal planes of the axles. The suspension of the yoke beams in the lower, forked ends of the links, permits of the freedom of movement of the forward wheel when one forward wheel changes position above and below the plane of movement of the rear wheels, and without distortion to the truck frame and at the same time avoids forwardly and rearwardly swinging movements of the yoke beams.

Instead of the link connection with the axle, I may employ a ball and socket connection of the yoke beam and axle, as seen in Fig. 6. In this construction, instead of the circular casting 19, at the end of the yoke beams, I employ a shaft bearing or box 54, having a removable cap plate 55, secured by the bolts 56 to the bearing or box 54. In the box 54 is a socket 57. Upon the axle 58, of the vehicle, which is cylindrical in cross-section, is cast a ball 59, which fits within the socket 57, of the box or bearing 54.

While the ball and socket connection affords a yielding movement to both axle and yoke beam, the links have the advantage of a suspension and a swaying movement which adjusts and equalizes itself to the varying movements vertically, of the wheels upon opposite sides of the truck. Such other modifications may be employed as are within the scope of the appended claims.

Having fully described my invention, what I now claim as new and desire to secure by Letters Patent is;

1. In a vehicle, a truck supporting the body of the vehicle composed of parallel axles, and wheels supporting the axles, yoke beams connected with the axles, studs on the central portions of the said beams, and guide bearings or boxes pivotally connected with the studs, a truck body comprising a transverse plate, and webs thereon having guide openings adapted to receive the guide boxes on the yoke beams, spring supporting plates pivotally connected with the central portion of the yoke beams, and leaf springs carried by said pivoted plates, lugs on the truck body, and wrist pins on the lugs with which the ends of the leaf springs are connected.

2. In a vehicle, a truck supporting the body of the vehicle, composed of parallel axles, and wheels supporting the axles, yoke beams, and forked links connecting the ends of the yoke beams with the axles, studs on the central portions of the yoke beams, and grooved guide bearings or boxes having central openings, and loosely mounted on said studs, said central portions of the yoke beams having vertical openings and downwardly-tapering bearing plates pivotally connected with the yoke beams within said openings in the line of the axis of said studs, a truck body comprising a plate transversely disposed in relation to the yoke beams, and webs thereon extending downwardly and provided with vertical openings adapted to receive slidingly the grooved box or bearing on said studs, lugs on said transverse plate, and wrist pins on said lugs, leaf springs attached to the pivoted plates in the openings in the yoke beams and having their outer ends connected with the wrist pins on said lugs.

NORMAN H. SOOY.

Witnesses:
 ROBERT O. McLIN,
 ANNIE L. GREER.